May 26, 1942.  P. M. FORSTER  2,283,981
LEAD POT HEATER
Filed Jan. 3, 1940
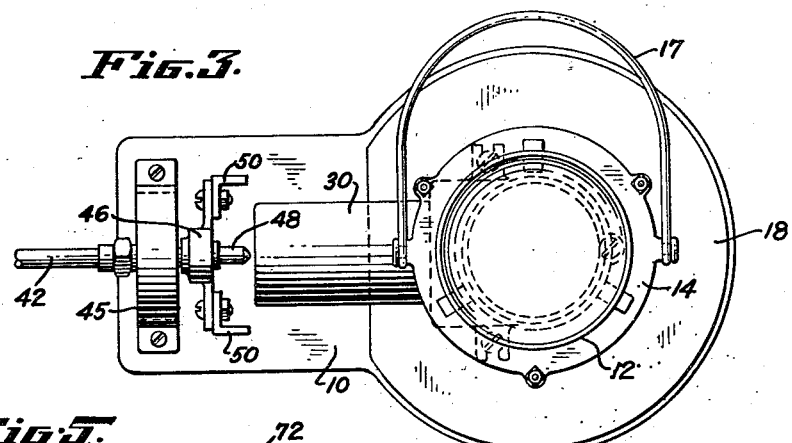
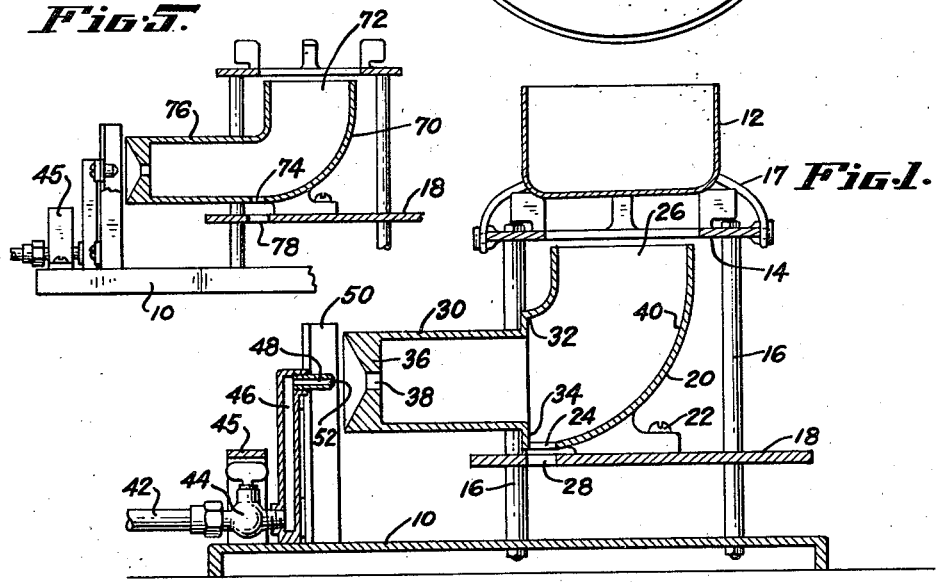
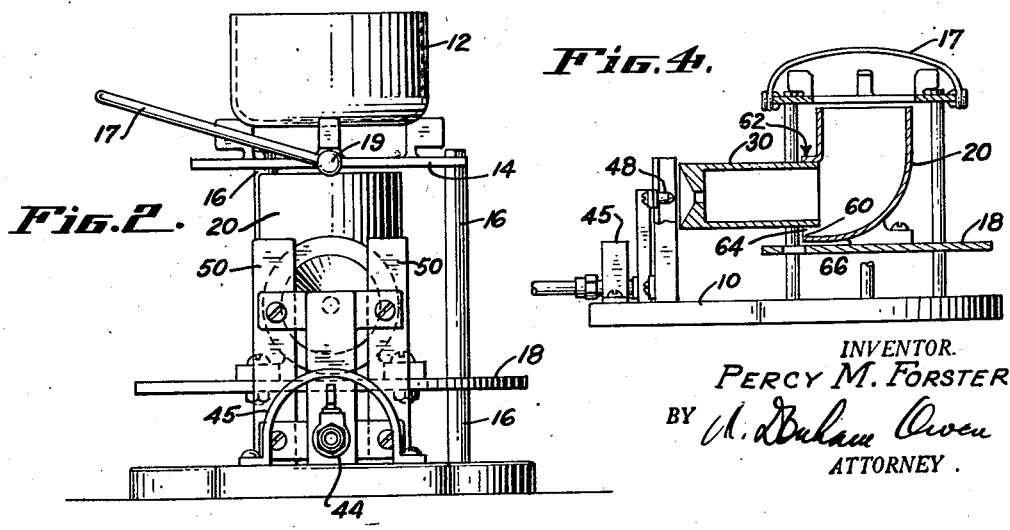
INVENTOR.
PERCY M. FORSTER
BY
ATTORNEY.

Patented May 26, 1942

2,283,981

UNITED STATES PATENT OFFICE 2,283,981

LEAD POT HEATER

Percy M. Forster, Berkeley, Calif.

Application January 3, 1940, Serial No. 312,190

3 Claims. (Cl. 126—240)

My invention relates to heaters, and particularly to a type of heater for heating lead pots, tar pots, etc., where molten metal, tar, etc., is spilled from the container onto the heater.

The usual type of pot heater has a burner directly beneath the pot, with the result that when the pot is agitated, the molten material will run over the top of the container, down the outside, and drip into the burner, plugging one or several or all of the burner orifices.

My invention has for its object to overcome these objections and to provide a pot heater in which the burner orifice is not placed directly beneath the grill; to provide means for automatically draining any molten material spilling into the burner chamber; to provide means for maintaining in a molten state any spillage until it is drained; and to provide a non-clogging burner orifice.

The invention possesses other objects and features of advantage, some of which, with the foregoing, will be set forth in the following description of a preferred form of my invention which is illustrated in the drawing accompanying and forming a part of the specification. It is to be understood that I do not limit myself to the showing made by the drawing and description as I may adopt a variation of the preferred form within the scope of my invention as set forth in the claims.

Several different forms of my device are shown in the drawing, wherein:

Fig. 1 is a side view, partially in section;

Fig. 2 is a front view;

Fig. 3 is a top plan view;

Fig. 4 is a modified form in side view partially in section; and

Fig. 5 is another modification, similarly shown.

In Fig. 1 I have shown a base 10 on which the other parts of the device may be mounted. A detachable melting pot 12 sits on the supporting grill 14 which may be attached to the base by support rods 16. Also supported by rods 16 is a heat deflector plate 18. On this is mounted the burner chamber 20 by means of a screw 22.

The burner chamber 20 may be of several different forms, the essential thing being that there is provided somewhere in its lower extremity an opening 24 through which any material falling through the mouth 26 will drain from the chamber. A corresponding opening 28 in plate 18 allows the molten material to fall onto the base 10 from which it can easily be cleaned. The burner chamber preferably is made from a 90° elbow having the opening 26 located directly under the grill 14. Instead of placing the burner unit under the opening 26, a horizontally disposed cylindrical extension burner member 30 connected to the end 32 of the elbow by a radial wall 34 is employed. Its other end is partially closed by the wall 36 having a centrally disposed opening 38 through which the combustible medium is introduced. In operation the flame sweeps through extension 30 and into the elbow where the wall 40 deflects it upwardly against the pot 12. By means of radial wall 34 and by having extension 30 of a smaller diameter than the elbow opening 32, the flame sweeps past the opening 24 without any substantial interference. Any spillage or overflow from pot 12 through opening 26 will strike the hot inner wall 40 and be maintained in a molten condition until it drains through the opening 24. In this way, no matter how much molten material, or even liquids, which would normally extinguish a fire fall into the opening 26, they will not interrupt combustion of the burner but will drain through opening 24.

In the drawing I have shown a device set up for the use of gas which is conducted to the unit through pipe 42 regulating valve 44, manifold 46 and orifice 48. The manifold unit 46 is supported by upright members 50 and is spaced away from the burner chamber 20, 30 so as to avoid any overheating, because it is realized that the combustion or burner chamber becomes very hot. The gas leaves orifice 52 and enters the burner chamber through opening 38. Sufficient air to support combustion is induced by the flow of gas through this opening and burning takes place inside the chamber 30.

The modifications shown in Figs. 4 and 5 are only two of many that are possible.

The difference in Fig. 4 and Fig. 1 is in the construction of the burner chamber 20, 30. In this modification the end opening 60 of elbow 20 is larger than the outside diameter of horizontal extension 30. The two units are secured together at 62, thereby providing a crescent shaped opening which is widest at point 64 and provides a sufficient opening for any molten material to drain therethrough. An opening 66 in plate 18 also facilitates free flow of any materials through opening 64.

The modification shown in Fig. 5 also relates to the burner chamber. There it comprises the elbow unit 70 having the mouth 72, opening 74, and horizontal portion 76. In this case the molten materials will exhaust through opening 74 and through opening 78 in plate 18.

In all these cases the flames sweep along over the inner wall of the combustion chamber and thereby maintain it at such a temperature that no material can become cold enough during operation of the burner to solidify.

Referring again to the construction shown in Fig. 4, the horizontal member 30 need not be rigidly secured to the elbow 20 at 62. It is sufficient, for instance, if a burner nozzle such as 30 is inserted in the open end 60 of an elbow. The important thing is that at the bottom there should be an opening 64 through which molten material can exhaust itself.

As a protection to regulating valve 44, a loop member 45 is provided. To facilitate handling of the device while it is hot, a bail 17 is pivoted at 19 to grill 14.

While I have shown a right angle elbow 20, a portion of the burner chamber, it should be understood that the angle could be less or even more as the case might be so long as the burner orifice 38 is offset with relation to the opening 26 into which spills any material from pot 12. The length of the horizontally disposed extension member 30 can be varied without departing from the spirit of my invention or the claims appended hereto. One of the important features of my invention is the provision of a non-continuous bottom at or near the lowest point in the burner chamber. This opening, such as 24 in Fig. 1, should be located at a low point and also at a point where the heat of combustion will maintain the walls hot enough to melt any material falling through into the heater, and cause it to run off.

What I claim is:

1. A lead pot heater comprising a base, an upwardly curved elbow mounted on said base providing a combustion chamber having an arcuate flame deflecting wall, means on said base for supporting a lead melting pot adjacent the upper end of said elbow and over the combustion chamber therein, a horizontally disposed cylindrical burner member communicating with the opposite end of said chamber through the lower end of said elbow, said burner member extending substantially parallel with said base and having its lower wall disposed a slight distance above the lower wall of said chamber to direct a flame into said elbow, said lower wall of said chamber having an opening at the lowermost point in said chamber and at the juncture between said elbow and cylindrical burner member, whereby the droppings from said melting pot into said elbow will be maintained in a molten state and automatically discharged through said port without the escape of flame from said combustion chamber.

2. In a lead pot heater comprising a base, a melting pot, an open support upstanding from said base and including an annular grill at its upper end, and said grill having an opening therein of less diameter than the base of said pot, an elbow providing an upwardly curving combustion chamber having its lower wall mounted on said base within said support and its upper end opening upwardly beneath the opening in said grill, a horizontally disposed burner member communicating with the opposite end of said chamber through the lower end of said elbow, said member extending parallel with said base and having its lower wall disposed a slight distance above the lower wall of said chamber to direct a flame into said elbow, said lower wall of said chamber having a drain port arranged at the lowermost point in said chamber at said point of juncture between the burner member and elbow and out of alinement with said lower wall of said burner member, whereby droppings from said melting pot within said elbow will be maintained in a molten state and automatically discharged through said port without the escape of flame from said combustion chamber.

3. A lead pot heater comprising a base, a melting pot, an open support upstanding from said base and including an annular grill, said grill having an opening therein of less diameter than the base of said pot, an elbow providing an arcuate combustion chamber having its lower curved wall mounted on said base within said support and its upper end opening upwardly beneath the opening in said grill, said combustion chamber having a horizontal burner member of slightly less diameter than the upwardly curving portion of said combustion chamber and communicating with the lower curved portion thereof to provide a tangential extension of said elbow, and said elbow having a discharge port at the lowermost point in the curved wall thereof and communicating with said chamber immediately below said burner extension, whereby droppings from said melting pot into said chamber will be maintained in molten condition and automatically discharged through said port without the escape of flame from said combustion chamber.

PERCY M. FORSTER.